(12) United States Patent  
Kato

(10) Patent No.: US 6,635,831 B2
(45) Date of Patent: Oct. 21, 2003

(54) OPERATING DEVICE

(75) Inventor: Mitsumasa Kato, Saitama-ken (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 10/014,579

(22) Filed: Dec. 14, 2001

(65) Prior Publication Data

US 2002/0092738 A1 Jul. 18, 2002

(30) Foreign Application Priority Data

Dec. 18, 2000 (JP) ........................................ 2000-384362

(51) Int. Cl.$^7$ ................................................. H01N 9/00
(52) U.S. Cl. ........................... 200/4; 200/341; 200/334; 16/121; 16/114 R
(58) Field of Search ................................ 200/341, 342, 200/345, 334, 4; 16/121–124, 118, 114 R, DIG. 40, DIG. 41; 74/553, 548

(56) References Cited

U.S. PATENT DOCUMENTS 3,188,124 A * 6/1965 Pestka et al. ................. 287/53
3,808,635 A * 5/1974 Moran et al. ................. 16/121
4,037,490 A * 7/1977 Wilson ......................... 74/553
4,295,246 A * 10/1981 Howie, Jr. .................... 16/121
5,857,242 A * 1/1999 Pizzo et al. ................... 16/121
6,073,312 A    6/2000 Dao et al.

FOREIGN PATENT DOCUMENTS

| DE | 84 09 337 U | 7/1985 |
| DE | 36 34 858 A1 | 4/1988 |
| FR | 2 659 489 | 9/1991 |

* cited by examiner

*Primary Examiner*—Elvin Enad
*Assistant Examiner*—K. Lee
(74) *Attorney, Agent, or Firm*—Young & Thompson

(57) ABSTRACT

An operating device (100) is provided with: a switch portion (4) having a rotation shaft (3); and a rotating operation portion (1) comprising an engagement portion (2) with which the rotation shaft is engaged. A stage difference portion (2a, 3a) is formed on at least one of the rotation shaft and the engagement portion for regulating a movement of the engagement portion with respect to the rotation shaft in an axial direction of the rotation shaft so as to form a space (10, 12) within the engagement portion at a tip side of the rotation shaft when the rotation shaft is engaged with the engagement portion.

11 Claims, 3 Drawing Sheets

OPERATING DEVICE

BACKGROUND OF THE INVENTION

1. Field of the Invention

The present invention relates to an operating device comprising a switch having a rotation shaft.

2. Description of the Related Art

As an operating device disposed on an operating panel of an AV (Audio/Visual) apparatus or the like, there is an operating device comprising a switch having a rotation shaft, which plays a role in adjusting a sound volume level as it is rotationally operated or moved by a user.

This operating device is provided with: a rotating operation portion rotationally operated by a user; and a switch portion disposed on a circuit board.

The rotating operation portion is shaped into a schematic cylinder. The rotating operation portion is constructed such that its side wall projects by a certain amount from a surface of the operating panel so that a user can hold and rotate the rotating operation portion.

On the other hand, the switch portion is mounted on a substrate of the circuit board through a plurality of terminals. On the rotating operation portion's side of the switch portion, there is disposed a rotation shaft, which is adapted to rotate and which expands perpendicular to the flat plane of the circuit board.

The rotation shaft of the switch portion is pressed and inserted into the cylindrical opening of the engagement portion of the rotating operation portion, so that the switch portion is united with the rotating operation portion.

Moreover, as the user holds and rotates the side wall of the rotating operation portion, the rotation shaft pressed and inserted into the engagement portion of the rotating operation portion is rotated. This rotational movement is used for the adjustment of the sound volume level.

By the way, when equipping an instrument panel of a vehicle supposed to be sold for Europe with the AV apparatus, under the purpose of the safety for people in the vehicle (especially, a child (a baby)), the structure of the operating device is standardized as described below. Namely, at least one of the below standards (1) and (2) is required in Europe.

Standard (1) of the Structure:

The projection amount of the side wall of the rotating operation portion from the surface of the operating panel is within the determined amount.

Standard (2) of the Structure:

In the case that the side wall of the rotating operation portion is projected from the surface of the operating panel by over the determined amount, when there is added an impulsive force of a predetermined load (about 40 kg weight) (which is regarded as the load received when a head of a child is bumped into the operating panel), the projection amount can be reduced by the impulsive force to be within the determined amount.

Although the above described standard (2) may be considered or researched, the above described standard (1) may be likely or often adopted.

However, in case of the above described standard (1), the determined amount is set as a substantially minimum value that a user can hold the side wall of the rotating operation portion. In other words, the projection amount of the side wall of the rotating operation portion is minimized as much as possible in a practical sense to prevent a head of a child (a baby) from easily contacting the edge of the block portion of the rotating operation portion when the head is bumped into the operating panel.

As a result, the above described standard (1) has such a problem that it is difficult for the user to hold and rotationally operate the side wall of the rotating operation portion because of its small projection amount.

On the other hand, it is practically rather difficult to adopt the above described standard (2) i.e., such a structure that the projection amount is over the determined amount to improve the operationality and is yet within the determined amount when the impulsive force is added.

SUMMARY OF THE INVENTION

It is therefore an object of the present invention to provide an operating device having the structure which fulfills the above described standard (2) to thereby improve the operationality, i.e., an operating device which can improve the operationality as well as the safety.

The above object of the present invention can be achieved by an operating device provided with: a switch portion having a rotation shaft; a rotating operation portion comprising an engagement portion with which the rotation shaft is engaged; and a stage difference portion formed on at least one of the rotation shaft and the engagement portion for regulating a movement of the engagement portion with respect to the rotation shaft in an axial direction of the rotation shaft so as to form a space, which may be cylindrical or prismatic, within the engagement portion at a tip side of the rotation shaft when the rotation shaft is engaged with the engagement portion.

According to the operating device of the present invention, when an impulsive force is added onto the rotating operation portion toward the switch portion along the axial direction of the rotation shaft, e.g., when the person or the like is bumped onto the rotating operation portion which is projected from a front of an operating panel, the rotating operation portion can be moved along the axial direction and its projection amount is certainly reduced as the rotation shaft is inserted deeper into the engagement portion by the impulsive force against the stage difference portion. Accordingly, the projection amount can be reduced within the amount defined by the aforementioned standard (2). On the other hand, in an ordinary condition, the movement or position of the engagement portion relative to the rotation shaft in the axial direction is regulated or defined by the stage difference portion. Thus, the rotating operation portion can be projected enough for a user to easily hold and operate it because of the existence of the space in the engagement portion before the rotation shaft is inserted deeper into the engagement portion by the impulsive force.

In one aspect of the operating device of the present invention, the stage difference portion is formed on an outer surface of the rotation shaft, has a predetermined width in the axial direction and projects outwardly from the outer surface by a predetermined amount in a radial direction of the rotation shaft.

According to this aspect, when the impulsive force is added onto the rotating operation portion, the rotating operation portion can be moved along the axial direction as the rotation shaft is inserted deeper into the engagement portion by the impulsive force against the stage difference portion, which is formed on the outer surface of the rotation shaft. On the other hand, in the ordinary condition, the movement or position of the engagement portion relative to the rotation shaft in the axial direction is regulated or defined by the stage difference portion, which is formed on the outer surface of the rotation shaft.

In this aspect, the stage difference portion may be integrally formed with the rotation shaft.

By constituting in this manner, the stage difference portion can be easily and surely realized.

Also in this aspect, the stage difference portion may be harder than the engagement portion so that the engagement portion is scraped by a tip of the stage difference portion when the rotation shaft having the stage difference portion is forced to be inserted deeper into the engagement portion.

By constituting in this manner, when the impulsive force is added onto the rotating operation portion, the rotating operation portion can be moved along the axial direction as the rotation shaft is inserted deeper into the engagement portion by the impulsive force while the engagement portion is scraped by the tip of the stage difference portion.

For example, resin may be used as a soft material for the engagement portion while aluminum may be used as a hard material for the rotation shaft as well as the stage difference portion.

In this case, the operating device may be further provided with a stopper disposed on the rotation shaft for stopping the movement of the engagement portion in the axial direction when the rotation shaft is forced to be inserted deeper into the engagement portion.

By constituting in this manner, it is possible to stop the movement of the engagement portion after it is moved by the impulsive force.

In another aspect of the operating device of the present invention, the stage difference portion is formed on an inner surface of the engagement portion, has a predetermined width in the axial direction and projects inwardly from the inner surface by a predetermined amount in a radial direction of the engagement portion.

According to this aspect, when the impulsive force is added onto the rotating operation portion, the rotating operation portion can be moved along the axial direction as the rotation shaft is inserted deeper into the engagement portion by the impulsive force against the stage difference portion, which is formed on the inner surface of the engagement portion. On the other hand, in the ordinary condition, the movement or position of the engagement portion relative to the rotation shaft in the axial direction is regulated or defined by the stage difference portion, which is formed on the inner surface of the engagement portion.

In this aspect, the stage difference portion may be integrally formed with the engagement portion.

By constituting in this manner, the stage difference portion can be easily and surely realized.

Also in this aspect, the rotation shaft may be harder than the stage difference portion so that the stage difference portion is scraped by a tip of the rotation shaft when the rotation shaft is forced to be inserted deeper into the engagement portion having the stage difference portion.

By constituting in this manner, when the impulsive force is added onto the rotating operation portion, the rotating operation portion can be moved along the axial direction as the rotation shaft is inserted deeper into the engagement portion by the impulsive force while the stage difference portion is scraped by the tip of the rotation shaft.

For example, resin may be used as a soft material for the engagement portion as well as the stage difference portion while aluminum may be used as a hard material for the rotation shaft.

In this case, the operating device may be further provided with a stopper disposed on the rotation shaft for stopping the movement of the engagement portion in the axial direction when the rotation shaft is forced to be inserted deeper into the engagement portion.

By constituting in this manner, it is possible to stop the movement of the engagement portion after it is moved by the impulsive force.

In another aspect of the operating device of the present invention, the operating device may be equipped on a front of an operating panel of an on-vehicle type AV apparatus.

According to this aspect, the operating device whose operationality and the safety are high can be realized on the front of the operation panel of the on-vehicle type AV apparatus.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Referring to the accompanying drawings, the embodiment of the present invention will be now explained with reference to FIG. 1 to FIG. 3.

Figure 1:
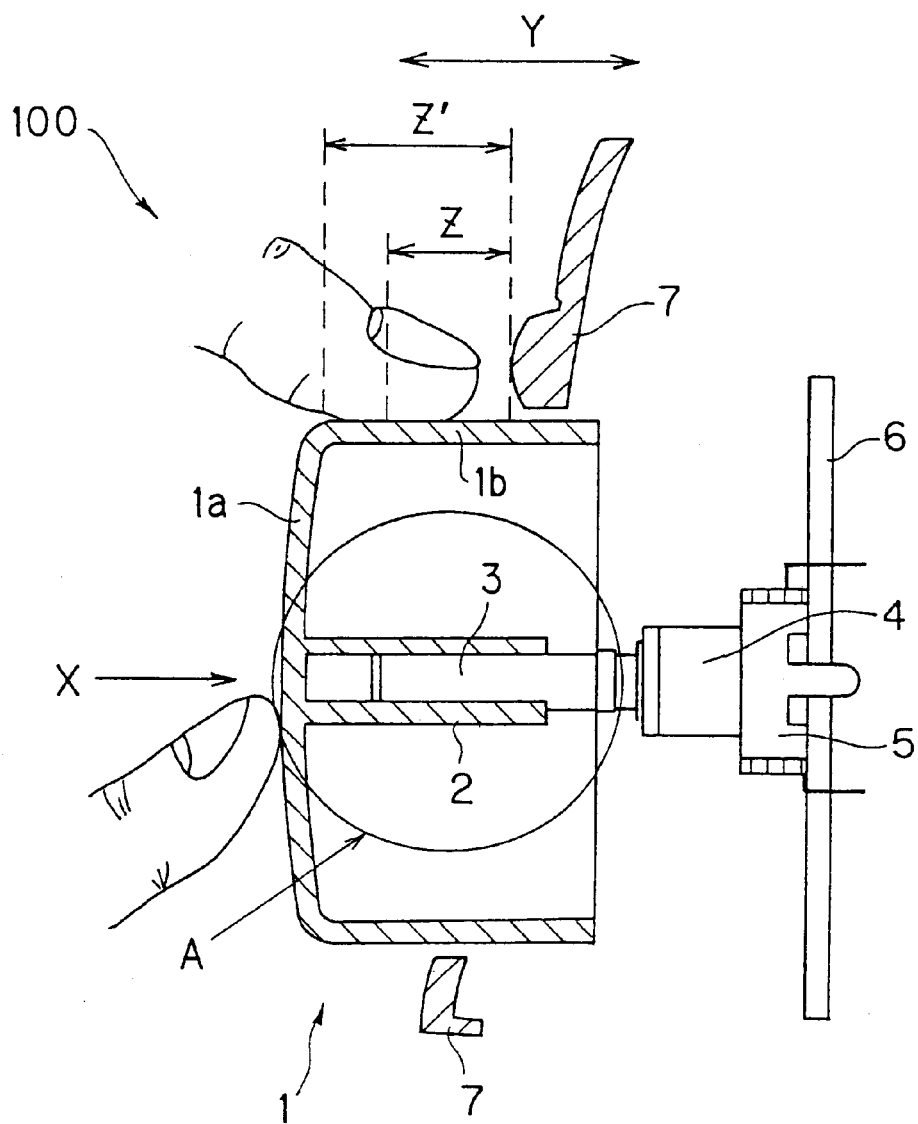
FIG. 1 is a cross sectional view showing an operating device of an embodiment of the present invention.

FIG. 1 shows an operating device 100 of the embodiment of the present invention. FIG. 2 shows a portion of the operating device 100, indicated by a circle A shown in FIG. 1. FIG. 3 shows another example of the structure shown in FIG. 2.

In FIG. 1, the operating device 100 is provided with: a rotating operation portion 1 rotationally operated by a user; and a switch portion 4 disposed on a circuit board 6. The rotating operation portion 1 is shaped into a schematic cylinder and is equipped with a block portion 1a whose one end side is blocked. The rotating operation portion 1 is constructed such that its side wall 1b projects by a certain amount from a surface of an operating panel 7 so that a user can hold and rotate the rotating operation portion 1 in the direction of the front side and the backside of FIG. 1.

Inside the rotating operation portion 1, there is formed a schematically cylinder-shaped engagement portion 2 which is integrally formed with the block portion 1a and which expands from the central portion of the block portion 1a perpendicular to a flat plane of the block portion 1a. In the engagement portion 2, there is defined a cylindrical space having a cylindrical opening at one end of the opposite side of the block portion 1a. Instead, there may be defined a prismatic space having a prismatic opening.

On the other hand, the switch portion 4 is mounted on a substrate 5 of the circuit board 6 through a plurality of terminals. On the rotating operation portion 1's side of the switch portion 4, there is disposed a rotation shaft 3 which is adapted to rotate and which expands perpendicular to the flat plane of the circuit board 6.

The rotation shaft 3 of the switch portion 4 is pressed and inserted into the cylindrical opening of the engagement portion 2 of the rotating operation portion 1, so that the switch portion 4 is united with the rotating operation portion 1.

As the user holds and rotates the side wall 1b of the rotating operation portion 1, the rotation shaft 3 pressed and inserted into the engagement portion 2 is rotated.

One of the characteristic features of the present embodiment is the portion indicated by the circle A in FIG. 1. This portion will be explained hereinbelow with reference to FIG. 2 and FIG. 3.

Figure 2:
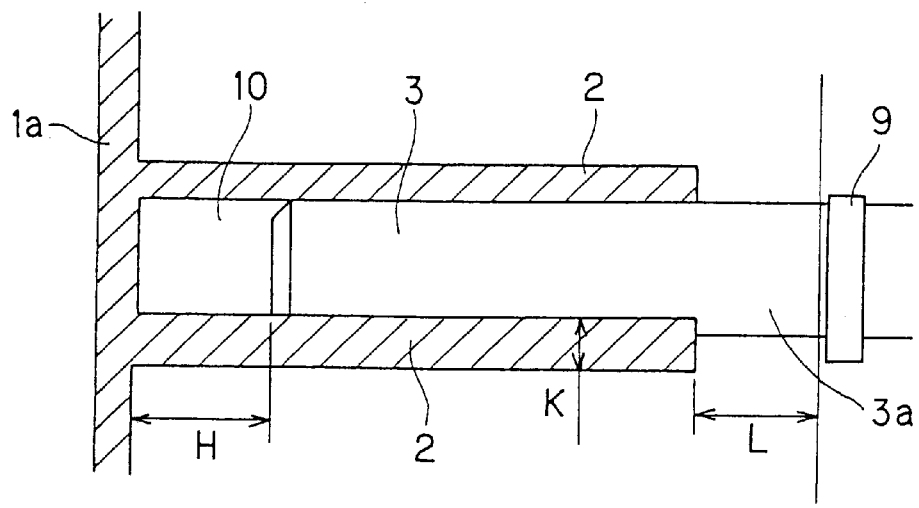
FIG. 2 is one magnified partial cross sectional view showing a portion indicated by a circle A shown in FIG. 1.

As shown in FIG. 2, a stage difference portion 3a projecting by a predetermined amount in the radial direction of the rotation shaft 3 and having a width L as a predetermined width in the axial direction of the rotation shaft 3 is disposed integrally on the rotation shaft 3 in the vicinity of the switch portion 4 in order to regulate a free movement of the engagement portion 2 in the pressing and inserting direction. The projection amount of the stage difference portion 3a in the radial direction ranges within a thickness K of the engagement portion 2. Moreover, the width L is reserved such that the engagement portion 2 can move when the impulsive force is added to the block portion 1a. The movement amount of the engagement portion 2 may be such an amount that the engagement portion 2 moves until the projection amount of the side wall 1b of the rotating operation portion 1 becomes within the determined amount set by the aforementioned standard (2).

Furthermore, in the vicinity of the switch portion 4 between the stage difference portion 3 and the switch portion 4, there is disposed a stopper portion 9 projecting by a predetermined amount in the radial direction of the rotation shaft 3 farther than the stage difference portion 3a does.

The stage difference portion 3a and the stopper portion 9 are integrally formed with the rotation shaft 3 by using harder material (e.g. an aluminum member) than that of the engagement portion 2 of the rotating operation portion 1 (e.g. resin).

In the case that the rotation shaft 3 is pressed and inserted into the cylindrical space of the engagement portion 2 in order to attach the rotating operation portion 1 to the switch portion 4, it is possible to insert it until the tip of the engagement portion 2 abuts onto the end portion of the stage difference portion 3a of the rotation shaft 3. Moreover, the whole width of the cylindrical space formed in the engagement portion 2 in the inserting direction (i.e., in the axial direction of the rotation shaft 3) is formed to include a cylindrical space 10 having the width H where the rotation shaft 3 is not inserted into when the tip of the engagement portion 2 abuts onto the end portion of the stage difference portion 3a of the rotation shaft 3 in the ordinary condition before an impulsive force is added onto the rotating operation portion 1. Furthermore, the width H of the space 10 is formed as wide as or a little wider than the width L of the stage difference portion 3a.

Figure 4:
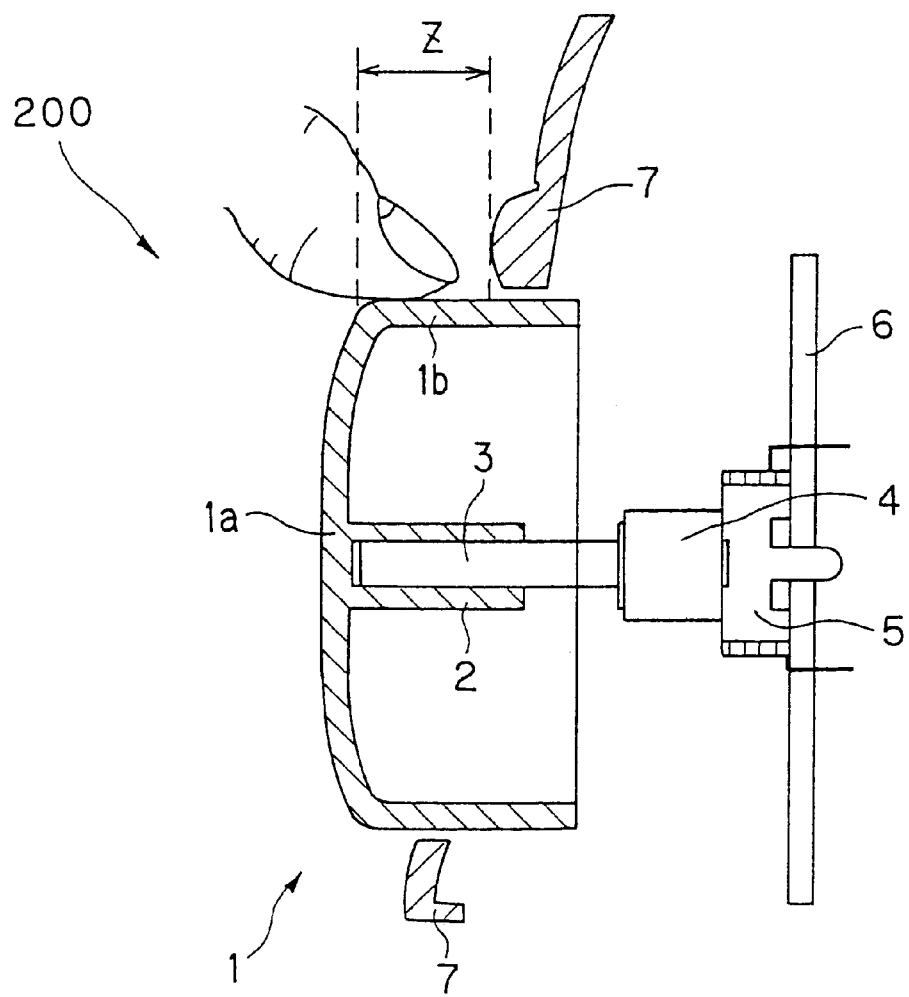
FIG. 4 is a cross sectional view showing an operating device of a comparison example of the present invention.

This structure enables the side wall 1b of the rotating operation portion 1 to project more from the surface of the operating panel 7, at widest by the width H of the space 10 with respect to the determined amount set by the standard (1) as compared with a comparison example as shown in FIG. 4 described later (which fulfills the aforementioned standard (1)), as indicated by an arrow Z' in FIG. 1). Therefore, the region where a user holds the side wall 1b becomes wider, which makes it easy for the user to rotationally operate the operating device 100.

Incidentally, in the case that the rotation shaft 3 is adapted to move in the both directions shown with the arrow Y in FIG. 1 and that the block portion 1a of the rotating operation portion 1 is employed as a press portion where a press operation is performed and that the rotation shaft 3 plays a role in switching the power ON/OFF by performing the press operation by a user through the press portion, the condition of the press operation of the operating device 100 becomes as follows.

Firstly, when the user presses the press portion (i.e., the block portion 1a) with his fingertip in the direction shown with the arrow X in FIG. 1, the tip of the engagement portion 2 presses the end portion of the stage difference portion 3a to thereby move the rotation shaft 3 to the right side of FIG. 1 as shown with the arrow Y in FIG. 1, and turns a not-illustrated switch of the switch portion 4 ON or OFF. Secondly, when the user releases his finger to stop performing the press operation, an elastic force of a not-illustrated elastic member disposed on the switch portion 4 makes the rotation shaft 3 to be in an original condition (which is the condition prior to the press operation). In this manner, if the rotation shaft 3 plays a role in the press operation, it allows a user to perform the usual press operation.

Next, the case that the impulsive force is added to the operating device 100 will be explained.

When the impulsive force is added to the block portion 1a, the engagement portion 2 moves to the right side of FIG. 1 as shown with the arrow Y in FIG. 1 so that the tip of the engagement portion 2 which abuts onto the end portion of the stage difference portion 3a is scraped by the stage difference portion 3a. If the impulsive force is over about 40 kg weight, the engagement portion 2 moves while the inside surface thereof is being further scraped by the stage difference portion 3a. In this case, the tip of the rotation shaft 3 enters into the space 10 of the engagement portion 2.

Basically, as described above, the material of the stage difference portion 3a is harder than that of the engagement portion 2, and the projection amount of the stage difference portion 3a in the radial direction of the rotation shaft 3 ranges within the thickness K of the engagement portion 2, so that the engagement portion 2 can be moved in the direction toward the stopper portion 9 while it is being scraped by the stage difference portion 3a.

In the case that the engagement portion 2 moves the farthest, it moves by the width L of the stage difference portion 3a and the tip thereof abuts onto the stopper portion 9.

In this manner, in the case that the impulsive force is added to the block portion 1a of the operating device 100, the engagement portion 2 can move while the tip and the inside surface thereof are being scraped by the stage difference portion 3a, so that it is possible to press the rotating operation portion 1 into the inside of the operating panel 7 and to make the projection amount of the side wall 1b of the rotating operation portion 1 to be within the determined amount set by the aforementioned standard (2). Moreover, after the engagement portion 2 is moved by the width L, the rotating operation portion 1 is not pressed into the inside of the operating panel 7 too much because of the limit of the moving of the engagement portion 2 by the stopper portion 9.

Figure 3:
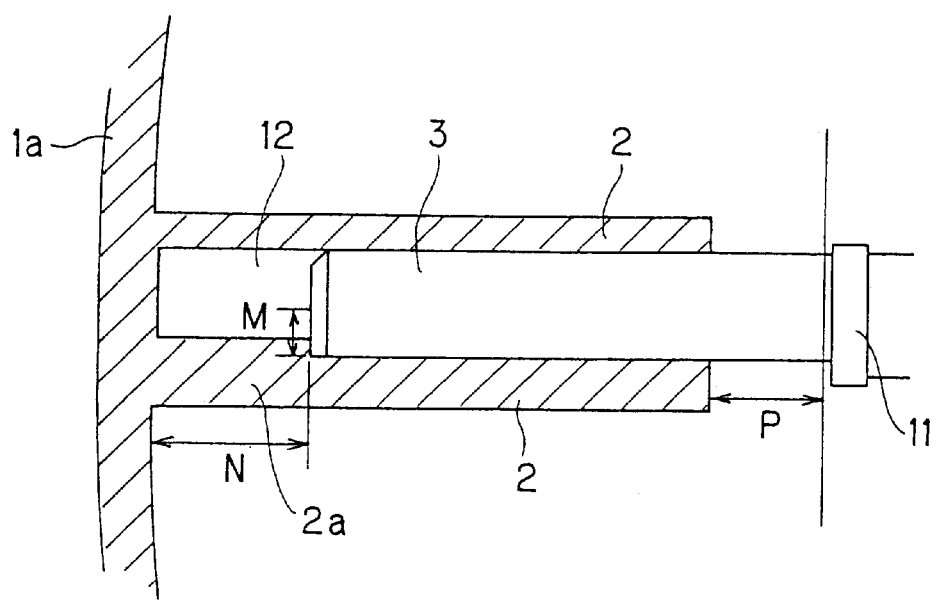
FIG. 3 is another magnified partial cross sectional view showing another example of the structure shown in FIG. 2.

FIG. 3 shows the rotation shaft 3 engaged with the engagement portion 2 by another structure shown in FIG. 2.

As shown in FIG. 3, a stage difference portion 2a projecting by a predetermined amount in the inner direction thereof i.e., the radial direction of the rotation shaft 3 and having a width N as a predetermined width in the axial direction of the rotation shaft 3 is disposed integrally on the engagement portion 2 in the vicinity of the block portion 1a in order to regulate an easy movement of the engagement portion 2 in the pressing and inserting direction. The projection amount of the stage difference portion 2a ranges within a radius M of the rotation shaft 3. Moreover, the stage difference portion 2a is integrally formed with the engagement portion 2 by softer material (e.g. resin) than that of the rotation shaft 3 (e.g. an aluminum member).

The rotation shaft 3 is integrally formed with a stopper portion 11 which is in the vicinity of the switch portion 4 and projects by a predetermined amount in the radial direction of the rotation shaft farther than the rotation shaft 3.

In the case that the rotation shaft 3 is pressed and inserted into the cylindrical space of the engagement portion 2 in order to attach the rotating operation portion 1 to the switch portion 4, it is possible to insert it until the tip of the rotation shaft 3 abuts onto the end portion of the stage difference portion 2a of the engagement portion 2. Moreover, the whole width of the cylindrical space formed in the engagement portion 2 in the inserting direction is formed to include a cylindrical space 12 having the width N where the rotation shaft 3 is not inserted into when the tip of the rotation shaft 3 abuts onto the end portion of the stage difference portion 2a of the engagement portion 2 in the ordinary condition before an impulsive force is added onto the rotating operation portion 1. Furthermore, the width N of the space 12 is formed as wide as or a little wider than a width P, formed when the rotation shaft 3 is engaged with the engagement portion 2, between the tip of the engagement portion 2 and the stopper 11.

Incidentally, the width P is reserved so that the engagement portion 2 can move when the impulsive force is added to the block portion 1a. The movement amount of the engagement portion 2 may be the amount that the engagement portion 2 moves until the projection amount of the side wall 1b of the rotating operation portion 1 becomes within the determined amount set by the aforementioned standard (2).

This structure enables the side wall 1b of the rotating operation portion 1 to project more from the surface of the operating panel 7, at widest by the width N of the space 12 with respect to the determined amount set by the standard (1) as compared with the comparison example as shown in FIG. 4 and described later (which fulfills the aforementioned standard (1)). Therefore, the region where a user holds the side wall 1b becomes wider, which makes it easy for the user to rotationally operate.

Incidentally, in the case that the rotation shaft 3 is adapted to move in the both directions shown with the arrow Y in FIG. 1 and that the block portion 1a of the rotating operation portion 1 is employed as a press portion where a press operation is performed and that the rotation shaft 3 plays a role in switching the power ON/OFF by a user performing the press operation through the press portion, the condition of the press operation of the operating device 100 becomes as follows.

Firstly, when a user presses the press portion (the block portion 1a) with his fingertip in the direction shown with the arrow X in FIG. 1, the stage difference portion 2a presses the tip of the rotation shaft 3 to thereby move the rotation shaft 3 to the right side of FIG. 1 as shown with the arrow Y in FIG. 1, and turns a not-illustrated switch of the switch portion 4 ON or OFF. Secondly, when the user releases his finger to stop performing the press operation, an elastic force of a not-illustrated elastic member disposed on the switch portion 4 makes the rotation shaft 3 to be in an original condition (which is the condition prior to the press operation). In this manner, if the rotation shaft 3 plays a role in the press operation, it allows a user to perform the usual press operation.

Next, the case that the impulsive force is added to the operating device 100 will be explained.

When the impulsive force is added to the block portion 1a, the engagement portion 2 moves to the right side of FIG. 1 as shown with the arrow Y in FIG. 1 so that the stage difference portion 2a is scraped by the tip of the rotation shaft 3 which abuts onto the end portion of the stage difference portion 2a. If the impulsive force is over about 40 kg weight, the engagement portion 2 moves while being further scraped by the rotation shaft 3. In this case, the tip of the rotation shaft 3 enters into the space 12 of the engagement portion 2. If the engagement portion 2 moves the farthest, it moves by the width P and the tip thereof abuts onto the stopper portion 11.

Basically, as described above, the material of the stage difference portion 2a is softer than that of the rotation shaft 3, and the projection amount thereof in the inner direction of the engagement portion 2 ranges within the radius M of the rotation shaft 3, so that the engagement portion 2 can be moved in the direction of the stopper portion 11 while the stage difference portion 2a is being scraped by the rotation shaft 3.

In this manner, in the case that the impulsive force is added to the block portion 1a of the operating device 100, the engagement portion 2 can move while the stage difference portion 2a thereof is being scraped by the stage difference portion 3a, so that it is possible to press the rotating operation portion 1 into the inside of the operating panel 7 and to make the projection amount of the side wall 1b of the rotating operation portion 1 to be within the determined amount set by the standard (2). Moreover, after the engagement portion 2 is moved by the width P, the rotating operation portion 1 is not pressed into the inside of the operating panel 7 too much because of the limit of the moving of the engagement portion 2 by the stopper portion 11.

Next, a comparison example of an operating device comprising a switch having a rotation shaft will be explained with reference to FIG. 4. FIG. 4 is a cross sectional view showing an operating device 200 of the comparison example. In this figure, the same constitutional elements as those in the operating device 100 shown in FIG. 1 to FIG. 3 carry the same reference numerals and the detailed explanations of them are omitted.

As shown in FIG. 4, the operating device 200 is not provided with the stage difference portion 3a or the stage difference portion 2a as in the present embodiment. Accordingly, the rotation shaft 3 of the switch portion 4 is pressed and inserted into the almost all of the cylindrical space through the cylindrical opening of the engagement portion 2 of the rotating operation portion 1.

In this manner, the operating device 200 as the comparison example is constructed such that in spite of whether or not the impulsive force is added, the projection amount of the side wall 1b of the rotating operation portion 1 from the operating panel 7 is within the determined amount in advance.

The determined amount set by the aforementioned standard (1) is considered as the least amount so that a user can hold the side wall 1b of the rotating operation portion 1. In other words, the projection amount of the side wall 1b of the rotating operation portion 1 is minimized as much as possible to prevent a head of a child (a baby) from contacting the edge of the block portion 1a of the rotating operation portion 1 when the head is bumped into the operating panel 7.

As a result, the structure of the comparison example brings such a problem that it is rather difficult for the user to hold and rotationally operate the side wall 1b of rotating operation portion 1 because of its small projection amount.

On the contrary to this comparison example, according to the present embodiment as described above in detail, the projection amount of the rotating operation portion 1 is over the determined amount to improve the operationality and is within the determined amount when the impulsive force is added.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-384362 filed on Dec. 18, 2000 including the specification, claims, drawings and summary is incorporated herein by reference in its entirety.

What is claimed is:

1. An operating device comprising:
   a switch portion having a rotation shaft;
   a rotating operation portion comprising an engagement portion with which the rotation shaft is engaged; and
   a stage difference portion formed on at least one of the rotation shaft and the engagement portion for regulating a movement of the engagement portion with respect to the rotation shaft in an axial direction of the rotation shaft so as to form a space within the engagement portion at a tip side of the rotation shaft when the rotation shaft is engaged with the engagement portion,
   wherein the stage difference portion is formed on an outer surface of the rotation shaft, has a predetermined width in the axial direction and projects outwardly from the outer surface by a predetermined amount in a radial direction of the rotation shaft, and
   wherein the engagement portion is scraped by a tip of the stage difference portion when the rotation shaft having the stage difference portion is forced to be inserted deeper into the engagement portion by an impulsive force of a predetermined load, which is added onto the rotating operation portion in a direction toward the switch portion along the rotation shaft.

2. An operating device according to claim 1, wherein the stage difference portion is formed of harder material than that of the engagement portion.

3. An operating device according to claim 2, wherein the stage difference portion is integrally formed with the rotation shaft.

4. An operating device according to claim 2, wherein the stage difference portion comprises aluminum while the engagement portion comprises resin.

5. An operating device according to claim 1, further comprising a stopper disposed on the rotation shaft for stopping the movement of the engagement portion in the axial direction when the rotation shaft is forced to be inserted deeper into the engagement portion by the impulsive force.

6. An operating device according to claim 1, wherein said operating device is equipped on a front of an operating panel of an on-vehicle type AV (Audio/Visual) apparatus.

7. An operating device comprising:
   a switch portion having a rotation shaft;
   a rotating operation portion comprising an engagement portion with which the rotation shaft is engaged; and
   a stage difference portion formed on at least one of the rotation shaft and the engagement portion for regulating a movement of the engagement portion with respect to the rotation shaft in an axial direction of the rotation shaft so as to form a space within the engagement portion at a tip side of the rotation shaft when the rotation shaft is engaged with the engagement portion,
   wherein the stage difference portion is formed on an inner surface of the engagement portion, has a predetermined width in the axial direction and projects inwardly from the inner surface by a predetermined amount in a radial direction of the engagement portion, and
   wherein the stage difference portion is scraped by a tip of the rotation shaft when the rotation shaft is forced to be inserted deeper into the engagement portion having the stage difference portion by an impulsive force of a predetermined load, which is added onto the rotating operation portion in a direction toward the switch portion along the rotation shaft.

8. An operating device according to claim 7, wherein the stage difference portion is integrally formed with the engagement portion.

9. An operating device according to claim 7, wherein the rotation shaft is formed of harder material than that of the stage difference portion.

10. An operating device according to claim 7, further comprising a stopper disposed on the rotation shaft for stopping the movement of the engagement portion in the axial direction when the rotation shaft is forced to be inserted deeper into the engagement portion by the impulsive force.

11. An operating device according to claim 9, wherein the rotation shaft comprises aluminum while the stage difference portion comprises resin.

* * * * *